J. T. OAKLEY.
HOE.
APPLICATION FILED SEPT. 16, 1916.

1,244,765.

Patented Oct. 30, 1917.

John T. Oakley
By W. M. Cady
Attorney

UNITED STATES PATENT OFFICE.

JOHN T. OAKLEY, OF DUBUQUE TOWNSHIP, DUBUQUE COUNTY, IOWA.

HOE.

1,244,765.  Specification of Letters Patent.  Patented Oct. 30, 1917.

Application filed September 16, 1916.  Serial No. 120,469.

*To all whom it may concern:*

Be it known that I, JOHN T. OAKLEY, a citizen of the United States, residing at Dubuque Township, in the county of Dubuque and State of Iowa, have invented certain new and useful Improvements in Hoes, of which the following is a specification.

It has been found by numerous experiments extending over a long time, in the cultivation of plants, especially in gardens, that in order to quickly and most successfully cut and eradicate the weeds, there must be provided a hoe having not only a sharp cutting edge, but that edge provided with cutting edges disposed in special angles whereby the weeds are attacked by sharp edges in numerous directions and thus rapidly disposed of.

It consists essentially in providing the lower horizontal cutting edge of a hoe with certain portions in horizontal and parallel planes, and others in angles of various degrees.

The following specification with the drawings accompanying the same, will describe and illustrate the peculiar shape and form of the blade of the hoe and its mode of operation.

Like characters of reference denote corresponding parts in each of the figures.

Figure 1:
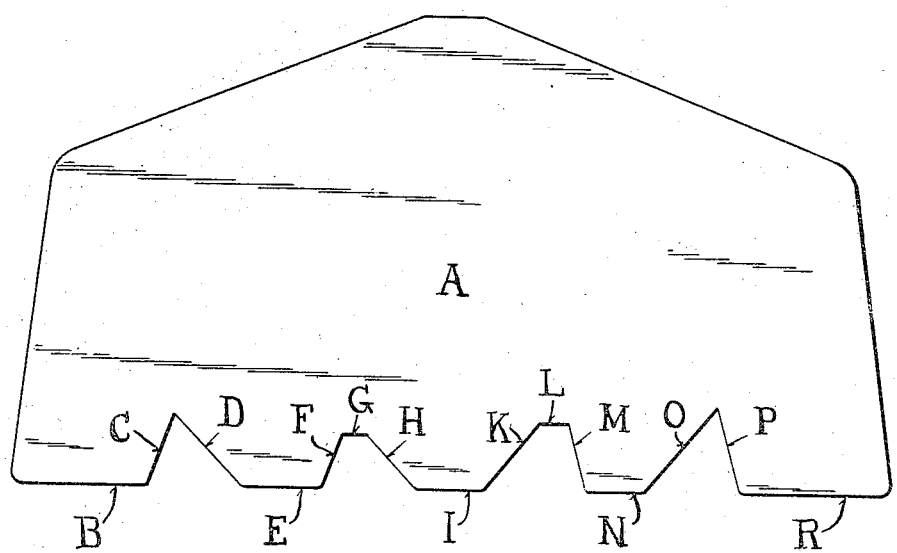
Figure 1 is a plan view of the face side of the hoe showing the cutting edge and the blades and angles.
Figure 2:
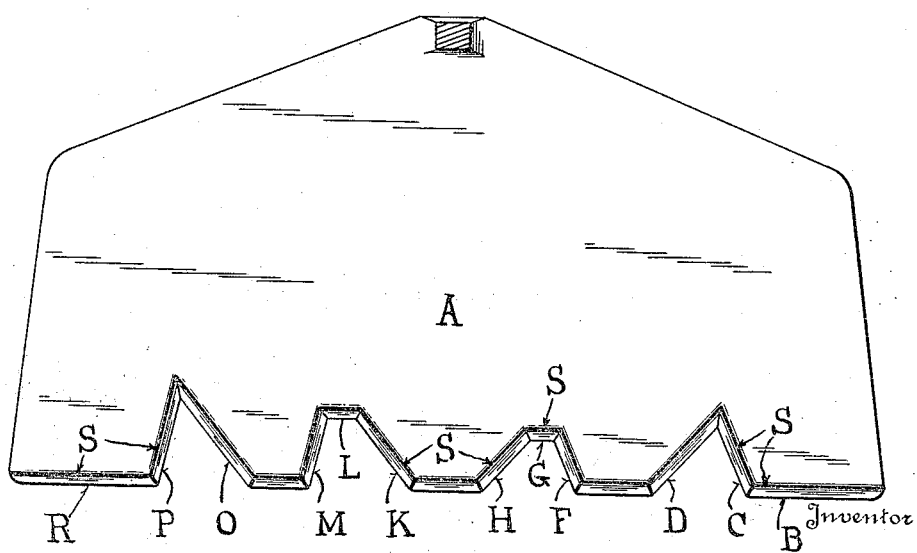
Fig. 2 is a plan view of the rear of the blade and shows the manner of sharpening.

Referring to the drawings A is the body of the hoe, which consists of an ordinary blade having the front or face edge of the blade provided with the cutting edges B, E, I, N and R all in substantially the same plane and the cutting edges C, D, F, H, K, M, O and P disposed at different angles to the plane of the cutting edges B, E, I, N and R and preferably at different angles to each other, with the cutting edges G and L in parallel planes to the cutting edges B, E, I, N and R in the lower front or face edge of the blade.

All of these edges, both in horizontal planes and angular are brought to a cutting edge by sharpening from the rear side along the line S.

It will be seen that by this mode of construction of the blade and sharpening of the same that a much larger cutting edge will be presented than if the hoe had only a cutting edge along its lower face and that the weeds will be attacked at different angles, and hence far more liable to be cut off and eradicated. If the weeds are struck at the lower end of the front cutting edge K, they will, as the hoe is drawn forward, in a straight line, be brought in a position for cutting the whole length of K and if not cut off will then come to L where they will be attacked at a different angle and be cut off, while those crowded against the almost right angle edge M will also be readily disposed of. Where the hoe is operated at an angle, the weeds will be attacked by sharp cutting edges at numerous angles, and the more readily severed.

Having now described my invention what I claim is:

1. A garden implement comprising a hoe formed with a flat blade having a straight primary cutting edge, and a plurality of notches in said edge with sides at varying angles to the cutting edge and to each other and sharpened to form secondary cutting edges.

2. A garden implement comprising a hoe formed with a flat blade having a straight primary cutting edge, and a plurality of angular notches in said edge, the sides of each notch inclining differently with respect to the cutting edge and sharpened to form secondary cutting edges.

3. A garden implement comprising a hoe formed with a flat blade having a straight primary cutting edge, and a plurality of angular notches in said edge, the sides of each notch inclining differently with respect to the cutting edge and to each other and sharpened to form secondary cutting edges, certain of said notches having their side edges connected by straight cutting edges parallel with the primary cutting edge.

In testimony whereof I affix my signature in the presence of two witnesses.

JOHN T. OAKLEY.

Witnesses:
M. M. CADY,
M. DYER.